D. MILLS.
THROTTLE PEDAL.
APPLICATION FILED SEPT. 27, 1920.
1,395,651.
Patented Nov. 1, 1921.
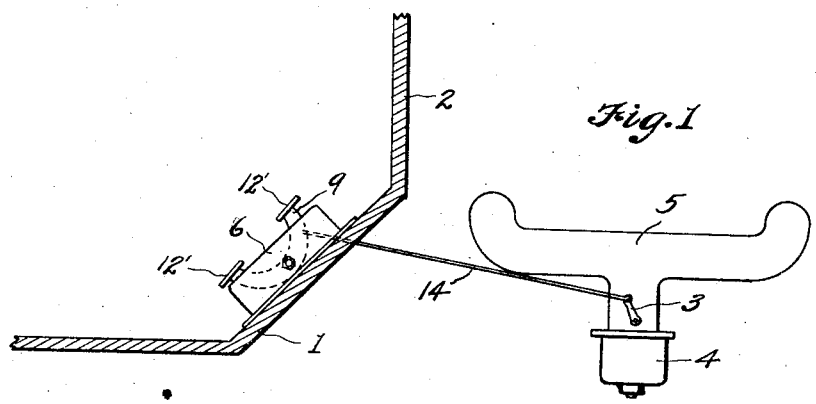
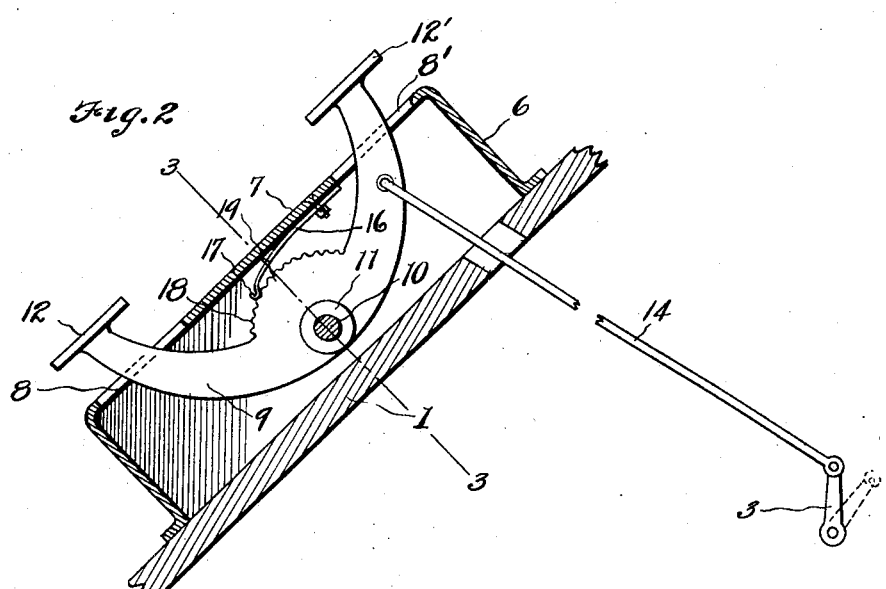
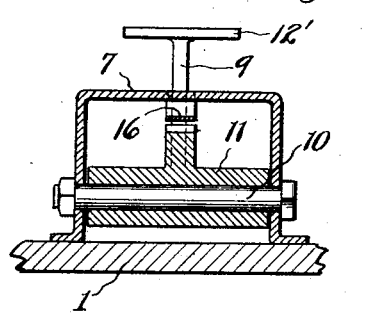
Inventor
DAVID MILLS
By Richard J. Cook
Attorney

UNITED STATES PATENT OFFICE.

DAVID MILLS, OF SEATTLE, WASHINGTON.

THROTTLE-PEDAL.

1,395,651.  Specification of Letters Patent.  Patented Nov. 1, 1921.

Application filed September 27, 1920. Serial No. 413,136.

*To all whom it may concern:*

Be it known that I, DAVID MILLS, a citizen of the United States, and resident of the city of Seattle, county of King, State of Washington, have invented certain new and useful Improvements in Throttle-Pedals, of which the following is a specification.

This invention relates to improvements in automobile control mechanism, and more particularly to what may be termed a throttle or accelerator pedal for controlling the throttle valve of the carbureter through which fuel charges are admitted to the engine of the vehicle wherein the device is used.

The principal object of the invention is to provide a pedal that may be mounted conveniently accessible to the driver of a vehicle and which may be so connected with the throttle valve lever that the latter may be adjusted by adjustment of the pedal, together with means which will yieldingly retain the pedal and valve at any adjustment until re-adjustment is desired.

A further object of the invention is to provide a device of the above character that will be neat and attractive in appearance, and which can be made at a relatively small expense.

In accomplishing these, and other objects of the invention, I have provided the improved details of structure, the preferred forms of which are illustrated in the accompanying drawings, wherein—

Figure 1 is a sectional view through the floor and dash board of a motor vehicle, showing a throttle pedal mounted in functional position, and connected with the throttle valve lever of a carbureter.

Fig. 2 is an enlarged longitudinal section of the pedal housing and pedal mounted therein.

Fig. 3 is a transverse section on the line 3—3 in Fig. 2.

Referring more in detail to the several views of the the drawings, wherein like reference numerals designate like parts—

1 designates an inclined portion of the floor of an automobile body which is adjacent to the dash board 2, and 3 designates the throttle valve control lever of a carbureter 4 through which fuel charges are delivered into the manifold 5 of the engine by which the vehicle is driven.

Mounted on the floor 1, is a rectangular, metallic housing 6 provided in its top wall 7 with openings 8—8′ through which are extended the opposite ends of a semi-circular pedal 9 which is pivotally supported, centrally of its ends, by a bolt 10 that is extended through the bearing portion 11 of the pedal and is supported at its ends in the opposite side walls of the housing. At its ends the pedal has heel and toe plates 12—12′ fixed thereon whereon the driver may place his foot to actuate the pedal pivotally on the bolt 10.

Pivotally attached at its rearward end to the forward portion of the pedal, is a rod 14 which at its forward end is pivotally fixed to the movable end of the valve lever 3. The connection is such that by moving the pedal from one limit to its opposite limit of travel, the lever will be correspondingly moved to actuate the valve between its open and closed positions.

In order that the pedal may be yieldingly held at any adjusted position between its limits of travel, I have provided a spring arm 16 which is fixed at one end to the under side of the top wall of the housing and at its outer free end has a rounded head 17 which is urged downwardly to engage a notched peripheral surface 18 on a circularly formed web 19 between the two portions of the pedal and concentric with the bolt 10.

With the device so constructed it will be seen that a driver may place his foot on the pedal to actuate it forwardly or rearwardly to adjust the throttle valve and when a suitable adjustment is made the foot may be removed and the pedal will be retained by the spring 16 engaging the notched surface 18, at the position to which it is adjusted.

Having thus described my invention, what I claim as new therein and desire to secure by Letters Patent is:

1. The combination with the actuating lever of a carbureter throttle valve, of a pivotally supported pedal having a notched surface, an actuating rod connecting the pedal with the said lever, and a yieldable member engaging the notched surface of the pedal to retain the latter at different positions of adjustment.

2. The combination with the actuating lever of a carbureter throttle valve, of a pivotally mounted pedal having a radially curved surface provided with peripheral notches, a spring arm having an end engageable with the notched surfaces to yieldingly retain the pedal at adjusted positions, and a rod connecting said pedal with said lever to actuate the latter in accordance with the movement of the pedal.

3. The combination with the actuating lever of a carbureter throttle valve, of a control device comprising a supporting housing having opposite side walls and a top wall provided with openings at its opposite ends, a bolt extended between the side walls within the housing, a foot pedal pivotally mounted on said bolt having end portions extended through said wall openings and having a radially curved surface provided with peripheral notches, a spring arm fixed within the housing having a head at the end thereof engageable with the said notches to retain the pedal at adjusted positions and a rod connected with said pedal and with said carbureter lever.

Signed at Seattle, Washington, this 20th day of September, 1920.

DAVID MILLS.